Patented Apr. 17, 1923.

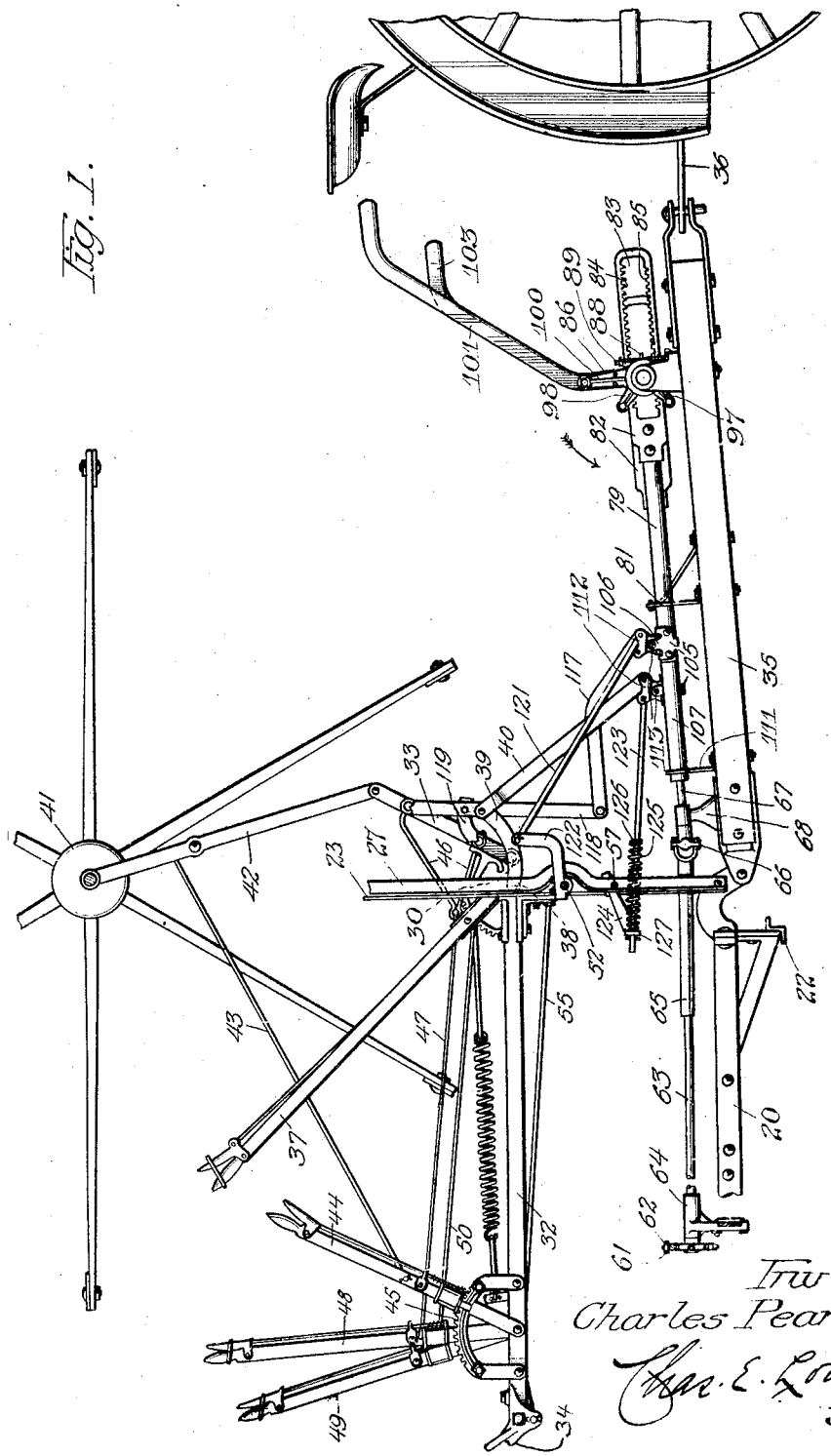

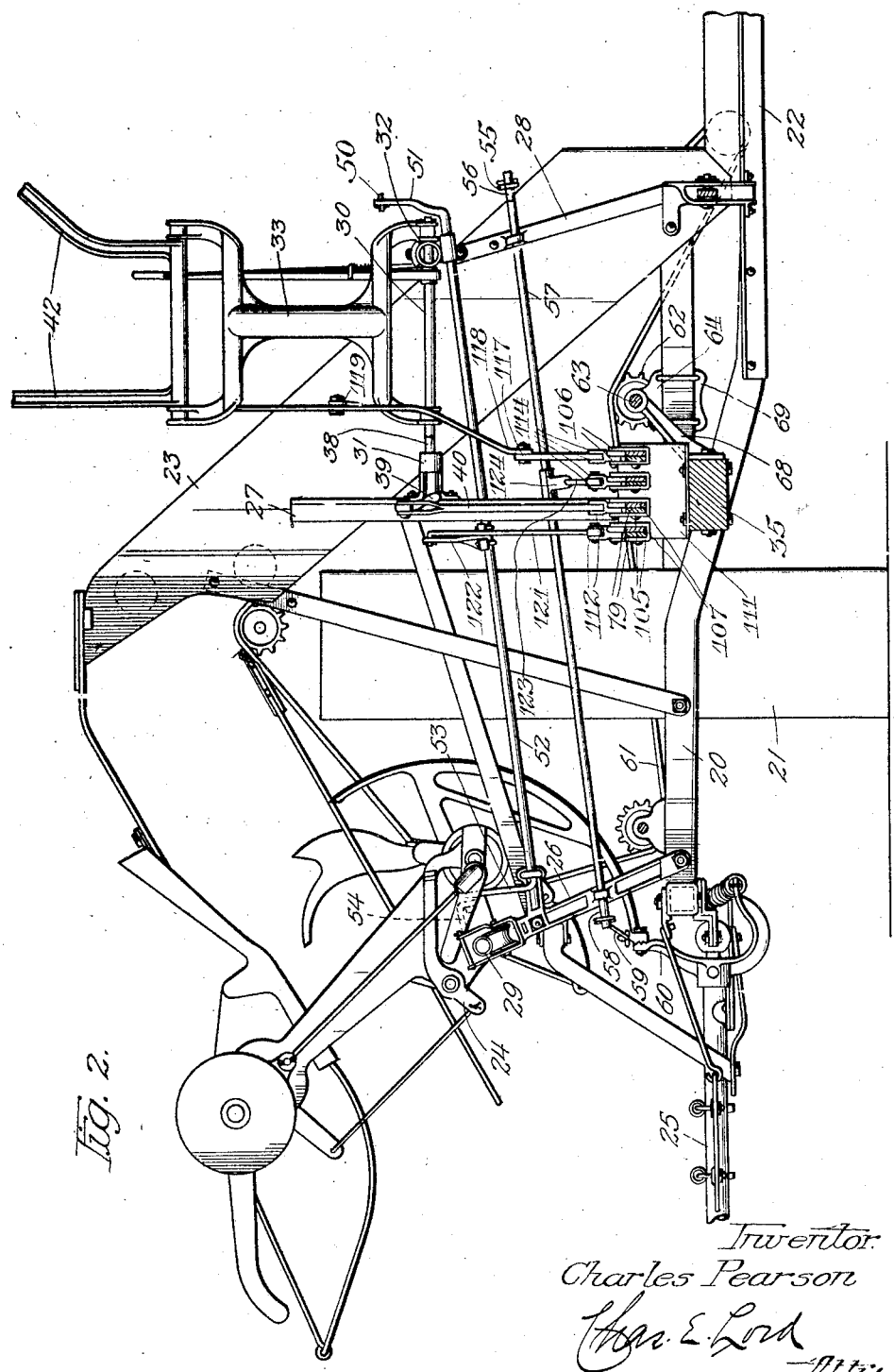

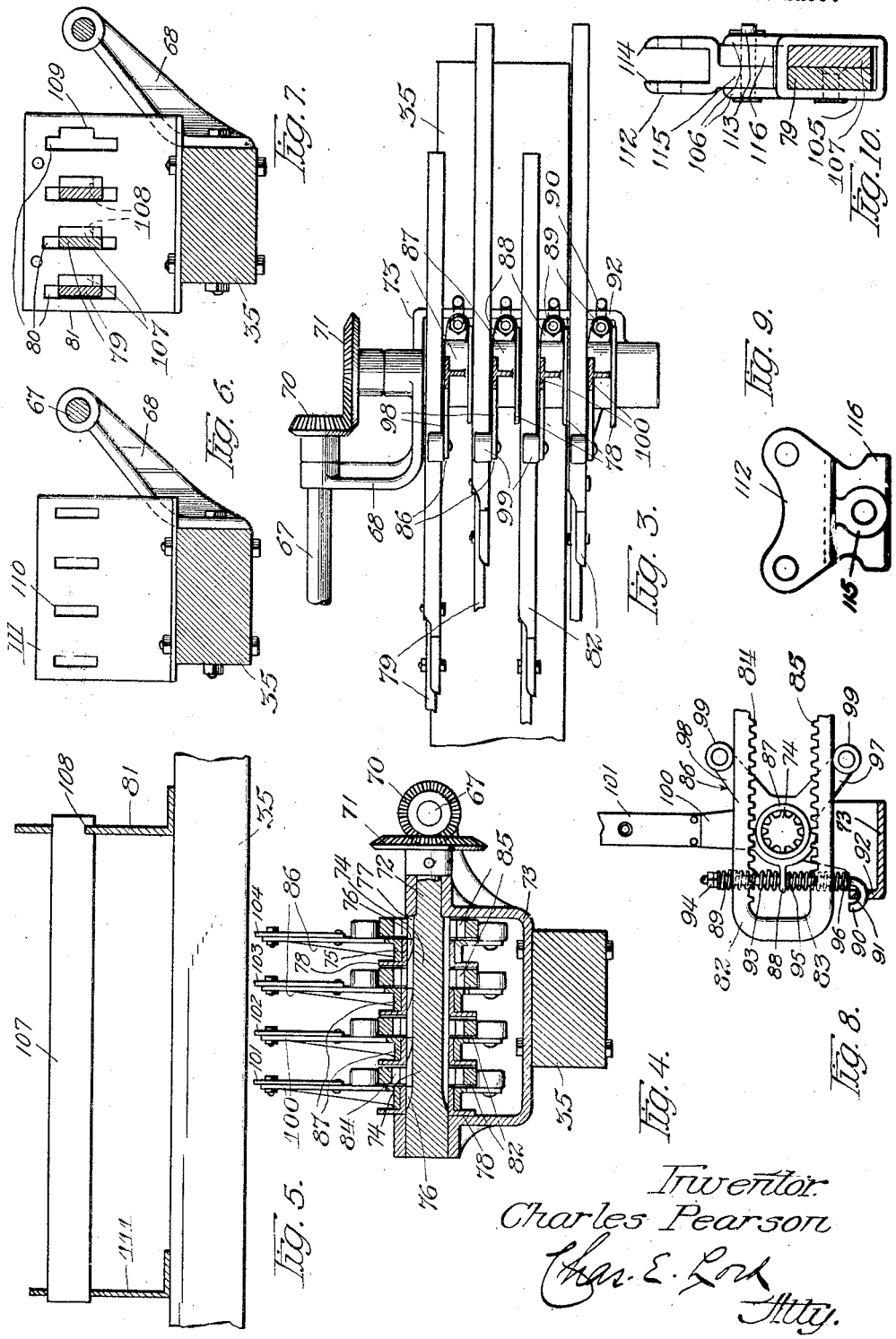

1,452,282

UNITED STATES PATENT OFFICE.

CHARLES PEARSON, OF CHICAGO, ILLINOIS, ASSIGNOR TO INTERNATIONAL HARVESTER COMPANY, A CORPORATION OF NEW JERSEY.

CONTROLLING MECHANISM FOR HARVESTERS.

Application filed February 26, 1919. Serial No. 279,438.

*To all whom it may concern:*

Be it known that I, CHARLES PEARSON, a citizen of the United States, residing at Chicago, in the county of Cook and State of Illinois, have invented certain new and useful Improvements in Controlling Mechanism for Harvesters, of which the following is a full, clear, and exact specification.

My invention relates to controlling mechanism for harvesters and machines of like character.

In the usual type of harvester now in use, various adjustments are provided for, such, for instance, as the tilting of the harvester, raising and lowering of the reel, shifting of the binding mechanism, and control of the bundle carrying mechanism.

At the present time it is becoming more and more common to use power units or tractors to propel harvesters in the field, and unless an additional operator is to be employed it becomes necessary to provide operative connections between the harvester and the power unit whereby a single operator may control the adjustments for the harvester from the tractor. As the attention of the operator is largely taken up with guiding a tractor, it is desirable that the adjustments for the various mechanisms of the harvester be made with as little effort on the part of the operator as possible.

With this object in view the present invention embodies controlling means for the adjusting mechanisms of the harvester operated from the tractor, and, further, embodies power driven connections for the adjusting mechanisms, these connections being manually controlled from the operator's seat on the tractor.

One embodiment of the invention has been illustrated in the accompanying drawings, and in these drawings—

Figure 1 illustrates in side elevation the rear end of a tractor and the front end of a harvester showing the operative connections between the two machines whereby the various adjusting mechanisms of the harvester are controlled;

Fig. 2 is a front elevation of the front end of the harvester, the connections between the harvester and the tractor being shown in section;

Fig. 3 is a top plan view of the front end of the power operated members which control the adjusting mechanism;

Fig. 4 is a sectional view of the construction shown in Fig. 3;

Fig. 5 is a side elevation illustrating the rear end portion of the stub tongue connecting the tractor with the harvester, and the controlling member carried thereby;

Figs. 6 and 7 are front elevational views of the front and rear brackets which support the bars carried by the stub tongue;

Fig. 8 is a detail elevational view of the front end of the reciprocating rack member and the supporting bracket therefor;

Fig. 9 is a side elevational view of a bar locking member; and

Fig. 10 is a sectional view illustrating the mounting for the locking member shown in Fig. 9.

The harvester in connection with which my invention is illustrated comprises the usual frame 20, main wheel 21, platform frame 22, elevator frame 23, binding mechanism 24, bundle carrier 25, and vertical standards 26, 27 and 28.

The standards 26, 27 and 28 are rigidly secured to the frame of the harvester in any suitable manner, the standard 26 supporting the binding mechanism 24, which is adjustably carried in the usual manner by a binder pipe 29 mounted on the standard 26. The shaft 30 is rotatably mounted at one end in a bearing bracket 31 carried by the standard 27, and at its opposite end is supported by a seat pipe 32 which in turn is carried by the standard 28. The reel-supporting bracket 33 is rotatably mounted on the shaft 30, and is adjustable on this pipe in a manner hereinafter set forth.

The seat pipe 32 has secured thereto near its rear end a bracket 34 in which is secured the usual spring support for the operator's seat (not shown). The harvester frame is connected by means of a draft member or tongue 35 to a drag bar 36 carried by the tractor frame.

The controlling mechanism for the various adjustments, provided for in the harvester, is adapted to be connected to any of the standard harvesters now in use, and therefore in illustrating my invention I have shown the usual adjusting levers carried by the harvester, and the usual connections between these levers and the various parts of the harvester to be adjusted. The tilting lever is shown in Fig. 1 at 37, this lever being secured to a shaft 38 suitably supported on the harvester frame, the shaft having secured thereto or formed integral therewith a forwardly projecting arm 39, which is connected by a link 40 to the stub tongue of the harvester. In the present instance the lower end of the link 40 is connected to certain controlling mechanism, which will be described more fully later in the specification. The reel 41 is rotatably mounted at the upper ends of bars 42 suitably supported in the reel-supporting bracket 33, the bars 42 being connected in the usual manner by a link 43 to a reel adjusting lever 44 by means of which the reel may be adjusted forwardly and backwardly with respect to the cutting apparatus and harvester apron. The lever 44 is provided with the usual pawl mechanism, which co-operates with a rack 45 to hold the lever in its adjusted position. The reel supporting bracket 33 has secured thereto a rearwardly extending bracket 46, which is connected by means of a link 47 to an adjusting lever 48, which is also provided with the usual pawl mechanism co-operating with a corresponding stationary sector. The lever 48 controls the vertical position of the reel, and by manipulating this lever the reel may be raised and lowered. Suitable adjusting mechanism is also provided for shifting the binding mechanism on the binder pipe 29, this mechanism comprising a lever 49 connected by a link 50 to a crank 51 carried at one end of a rod 52 journaled on the standards 28 and 26, the opposite end of the rod 52 being provided with a crank 53 which is connected by a link 54 to the binding mechanism. The binder shifting lever 49 is also provided with suitable pawl and sector locking mechanism.

The bundle carrier 25, which is illustrated in connection with my invention, is identical in construction with that illustrated and claimed in Patent No. 440,687 to Baker, issued November 18, 1890, and since no novelty per se is claimed in the bundle carrier, the mechanism has not been illustrated in detail. The controlling mechanism for this bundle carrier is also illustrated in the patent described, and comprises a link 55 which is connected at its rear end to the tripping mechanism carried by the seat pipe, and is connected at its front end to a crank 56, preferably formed integral with a rod 57 rotatably mounted on the standards 26 and 28. The rod 57 has formed thereon at its opposite end a crank 58, which is connected by means of a link 59 to a rotatably mounted bracket 60 which supports the bundle carrier.

In my improved construction the various adjusting mechanisms above described are operated by means of power derived from the harvester wheel, and manual controlling means is provided whereby the power connections for the operating mechanisms may be connected to and disconnected from the source of power. In order that the manual controls may be within the reach of the tractor operator, these controls and the operative connections between the adjusting mechanisms and the controlling levers and the power driven member are carried by the stud tongue or draft member 35 which connects the harvester to the tractor. The power for operating the adjusting mechanisms is derived from the main wheel of the harvester by suitable gearing, this gearing not being illustrated in detail since the usual power transmitting mechanism is employed.

A chain 61 is used to drive the binder shaft and conveyer rollers, and this chain passes over and drives a sprocket wheel 62 carried at the rear end of a shaft 63 supported in a bracket 64 carried by the harvester frame. The front end of the shaft 63 telescopes with a shaft 65, which in turn is provided at its front end with a universal joint 66, by means of which it is connected to the rear end of a shaft 67 journaled in brackets 68 secured to stub tongue. The shaft 67 carries at its front end a bevel gear 70, which meshes with a beveled gear 71 secured to a shaft 72 journaled in a U-shaped supporting bracket 73 carried by the stub tongue 35. The shaft 72 has mounted thereon, or formed integrally therewith, between the arms of the bracket 73, an elongated pinion 74 which is rotated whenever the shaft 72 is rotated. The pinion 74 on the shaft 72 carries a plurality of sleeves 75, each of the sleeves being provided with a downwardly extending key 76 disposed between two adjacent teeth of pinion 74, as shown at 77. The sleeves 75 are also provided with outwardly extending flanges 78 in order to prevent lateral movement of the racks on pinion 74, as hereinafter described.

The driving connections between the adjusting mechanisms on the harvester and the pinion 74 carried by the shaft 72, comprise a plurality of longitudinally reciprocable bars 79 slidably mounted in vertical slots 80 formed in a bracket 81 secured to the stub tongue intermediate the front and rear ends of the same. Each of the bars 79 has secured thereto, and at its front end, a double rack member 82 having an elongated slotted opening 83 formed therein, the longitudinal slots of the opening being provided with upper and lower racks 84 and 85. As shown in Figs. 4 and 8, the pinion 74 is disposed between the upper and lower walls of the openings 83 in the members 82, or between the rack 84 and the rack 85.

Means is provided for supporting the rack members 82 normally in such a position that the pinion 74 will be disposed between the racks 84 and 85, but will not contact with either rack. This supporting means comprises V-shaped brackets 86 having central bearing portions 87 which are rotatably mounted on the flanged sleeves 75. The bearing portions 87 have integral therewith and extending radially therefrom apertured lugs 88, through which are passed vertical rods 89 having hooked lower ends 90 extending through suitably spaced apertures 91 formed in an upwardly extending flange 92 formed integral with the bracket 73. A spiral spring 93 is carried by each of the rods 89, and is positioned between the lug 88 through which said rod passes, and a nut 94 carried by the upper end of the rod. A second spring 95 is also carried by each of the rods, and is positioned below the lug 88, and between said lug and a transverse pin 96 carried at the lower end of the rod 89.

It will be seen from this construction that the springs 93 and 95 will maintain the lugs 88 in a central position on the rod 89, thereby determining the position of the arms 97 and 98 of the V-shaped bracket 86. These arms 97 and 98 are provided at their outer ends with rollers 99 which extend over and bear against the outer surfaces of the rack members 82, thereby normally holding this rack member in central position, and in a position in which the pinion 74 is out of contact with the racks 84 and 85. The brackets 86 also have formed thereon upwardly extending lugs 100 to which are secured operating levers 101, 102, 103 and 104, by means of which the brackets may be swung on their pivot or about the sleeves 75, thereby forcing the rack member upwardly or downwardly, and forcing one or the other of the racks into contact with the pinion 74 which controls said rack.

It will, of course, be understood that as the rack member is moved in one direction, and one of the racks is placed in contact with the driving pinion 74, the rack member will be moved in a certain direction, whereas when the member is moved to such a position as to place the other rack in contact with the pinion the rack member will be moved in the opposite direction.

As illustrated in the drawings, a downward movement of the controlling levers 101—104 places the lower racks 85 in contact with the pinion 74, and consequently moves the rack members forwardly or toward the tractor, and an upward movement of these levers will place the racks 84 in contact with the pinion 74, and will move the rack members in the opposite direction or rearwardly. As soon as the controlling levers 101—104 are released by the operator, the rack member immediately is returned to its neutral position by means of the springs 93 and 95, in which position neither of the racks is in contact with its corresponding gear.

The rear ends of the longitudinally reciprocable bars 79 are connected with the adjusting mechanisms in the following manner: Each of the bars 79 carries at its rear end a bracket 105, which is secured to the bar and is formed with two upwardly projecting spaced apertured lugs 106. Each of the brackets 105, in addition to being secured to one of the bars 79, also embraces a second bar 107, the bracket being movable with respect to this bar 107. The bars 107 are notched at their front ends, as shown at 108, the front notched portions being supported in offset cutaway portions 109 formed in the slots 80 carried by the bracket 81.

The method of mounting the front ends of the bars 107 in the cutaway portions 109 will be clear from the illustration in Figs. 5 and 7, these bars being inserted in the slots 80, and then being moved laterally with a notched portion engaging the bracket 81, as shown in Fig. 7. After these bars have been moved to their position in the offset portions 109, the rear ends of the longitudinally reciprocable bars 79 may be inserted in the slots 80. The rear ends of the bars 107 are supported in slots 110 formed in the bracket 111 secured to the stub tongue adjacent its rear end. From the mounting of the notched ends of the bars 107 in the offset portions 109 of the slots 80 formed in the bracket 81, it will be understood that these bars 107 are stationary, and are held against endwise movement by means of the engagement of the notches 108 with the bracket 81. Suitable means has been provided for locking the adjusting mechanisms in the positions to which they are adjusted by means of the power driven connections, and this locking mechanism comprises a series of locking members 112 which are pivotally mounted on pins 113 carried by the lugs 106 of the brackets 105. These locking members are provided with spaced lugs 114 at their upper ends, the lugs having aligned apertures thereon for reception of links by means of which they are connected to the harvester adjusting mechanisms in a manner hereinafter described. The locking members are also provided at their lower ends with journal portions 115, which are positioned over the reciprocable bars 79, and with elongated portions 116, which are positioned over the stationary bars 107.

Each of the members 112 is connected to one of the adjusting mechanisms of the binder, one of the members 112 being connected by means of a link 117 to a link 118 which is secured at its upper end to the reel supporting bracket 33, and is also secured intermediate its ends by a brace 119 to another portion of the supporting bracket. Therefore, as the longitudinally reciprocable bar 79, which carries the locking member 112 to which link 117 is connected, is reciprocated, the reel is raised or lowered.

Another of the locking members 112 is connected by means of the link 40 to the forwardly projecting arm 39 which controls the tilting of the harvester, and therefore as this locking member is reciprocated with its corresponding longitudinally reciprocable bar the harvester is tilted.

Another of the locking members 112 is connected by means of a rod 121 to an arm 122 which projects forwardly from the binder shifting shaft 52, and as this locking member is moved forwardly and rearwardly the binder mechanism is shifted. The remaining member 112 is connected by means of a rod 123 to an arm 124, which in turn is secured to the shaft 57 which controls the bundle carrier dump. The connection between the rods 123 and the arm 124 is resilient, and is accomplished by means of a spring 125 which is carried by the rear end of the rod pressed at one end against a pin 126 carried by the rod, and at the opposite end against an apertured lug 127 pivotally mounted on the arm 124. the rod 123 passing through this apertured lug. Therefore, as the member 112, which is connected to the rod 123, is reciprocated, the bundle carrier is dumped.

The locking action of the members 112 takes place in the following manner: Assume, for instance, that the reel controlling lever 104 is pushed upwardly by the operator; this movement of the lever will also move the upper rack 84 downwardly into contact with pinion 74, and assuming that the pinion moves in the direction of the arrow shown in Fig. 1, the longitudinally reciprocable bar 79 that controls the reel will be moved rearwardly, carrying with it its bracket 105 and member 112. As the member 112 is moved rearwardly it will also move the link 117 rearwardly, and this will exert a rearward and upward movement on the link 118 which is connected to the reel supporting bracket, and will raise the reel. During the rearward movement of the locking member 112 carried by the reel actuating reciprocable bar 79, the front end of the portion 116 will slide on the stationary bar 107, but as soon as the rearward movement of the bar 79 is completed and the reel controlling lever 104 is released the rack 82 will return to central position, and the downward pressure exerted by the reel through the reel supporting bracket 33 and links 118 and 117 will swing the locking member 112 about its pivot, and will force the front end of the portion 116 of said bracket into contact with the stationary bar 107 which is supported in the bracket 81 adjacent the reel actuating longitudinally reciprocable bar 79. Since this bar 107 is stationary, and is held against longitudinal movement, the contact of the front end of the portion 116 of the locking member 112 with the upper surface of the bar will lock this member against longitudinal movement. The reel will, therefore, be held in the adjusted position. When the operator desires to lower the reel the lever 104 is moved downwardly about its pivot, thereby raising the rack 85 into contact with the corresponding pinion 74, and the rack member 82 and longitudinally reciprocable bar 79 will be moved forwardly, carrying with them the bracket 105, member 112, and links 117 and 118.

The method of adjusting the remaining mechanism of the harvester is exactly similar to that of adjusting the reel, all of the bars 79 and locking members 112 operating in the same manner, and for this reason a detailed description of the operation of the remaining adjusting mechanisms is not believed to be necessary.

From the above description it will be seen that means has been provided by which the tractor operator with but little effort on his part may positively control the various adjusting mechanisms of the harvester, the power for operating these mechanisms being derived from the main wheel of the harvester.

It will be seen, also, that the controlling mechanism and power connections are all carried by the stub tongue of the harvester, which may be connected to any standard make of tractor, and this construction is therefore of universal application, and is not limited to any particular design of tractor or harvester.

It should also be noted that in working out this invention the ordinary controlling connections for the adjusting mechanisms of the harvester are utilized, and after making connections from these elements to the power operated members it is merely necessary to lock the latching mechanism carried by the harvester levers out of engagement with the sectors carried on the harvester frame.

Attention is also called to the fact that the rack members by means of which the power is transmitted from the power shaft to the adjusting mechanisms are automatically returned to normal position whenever the controlling levers are released, and therefore after the mechanism to be adjusted has been moved to the desired position the operator has merely to release the lever, and the adjusted mechanism is automatically locked in its adjusted position.

While I have shown and described but a single embodiment of my invention, it is to be understood that the invention is capable of modification. Modifications, therefore, in the construction and arrangement of parts may be made without departing from the spirit and scope of the invention as expressed in the following claims.

Claims:

1. In combination, a harvester, adjusting mechanism carried thereby, power connections for actuating said mechanism, a draft member connected to the harvester and manually operable controlling means for said connections mounted on said draft member.

2. In combination, a harvester, adjusting mechanism carried thereby, power connections for positively actuating said mechanism in a plurality of directions, a draft member connected to the harvester, and manually operable controlling means for said connections carried by said draft member.

3. In combination, a harvester, adjusting mechanism carried thereby, power connections for positively actuating said mechanism in a plurality of directions, a draft member connected to the harvester, and manually operable normally inoperative means for controlling said connections carried by said draft member.

4. In combination, a harvester, adjusting mechanism carried thereby, actuating means for said adjusting mechanism adapted to be connected to a source of power, a draft member connected to the harvester and manually operable means carried by said draft member for connecting and disconnecting said actuating means to and from the source of power.

5. In combination, a harvester, adjusting mechanism carried thereby, a power shaft, a pinion mounted on said shaft, an actuating member for said adjusting mechanism having a pair of racks—one on each side of said pinion, means for controlling said actuating member, and means to normally hold said controlling means so that said pinion will be positioned between and out of engagement with said racks.

6. In combination, a harvester, adjusting mechanism carried thereby, actuating means for said adjusting mechanism adapted to be connected to a source of power, means for connecting said actuating mechanism to a source of power and disconnecting the same therefrom, and means carried by said actuating means for automatically locking said adjusting mechanism in adjusted position when said actuating means have been disconnected from the source of power.

7. In combination, a harvester, adjusting mechanism carried thereby, actuating means for said adjusting mechanism adapted to be connected to a source of power, means for connecting said actuating mechanism to a source of power and disconnecting the same therefrom, and pivoted means carried by said actuating means for automatically locking said adjusting mechanism in adjusted position when said actuating means have been disconnected from the source of power.

8. In combination, a harvester, adjusting mechanism carried thereby, actuating means for said adjusting mechanism adapted to be connected to a source of power, pivoted locking members carried by said actuating means, means for connecting said locking members to said adjusting mechanism, and means co-operating with said locking members to hold said adjusting mechanism in adjusted position.

9. In combination, a harvester, adjusting mechanism carried thereby, a stub tongue connected thereto, actuating means for the adjusting mechanism carried by said stub tongue and adapted to be connected to a source of power, and controlling means carried by said stub tongue for connecting said actuating means to the source of power.

10. In combination, a harvester, a stub tongue carried thereby, adjusting mechanism carried by said harvester, a power shaft carried by said stub tongue, actuating means carried by said tongue and connected to said adjusting mechanism, and manually operable means carried by said tongue for connecting said actuating means to said power shaft.

11. In combination, a harvester, a stub tongue carried thereby, adjusting mechanism carried by said harvester, actuating means carried by said stub tongue and connected to said adjusting mechanism, and manually operable controlling means for said actuating means carried at the front end of said stub tongue and adapted to connect said actuating means to a source of power.

12. In a harvester, adjusting mechanism carried thereby, a stub tongue pivotally connected to said harvester, longitudinally reciprocable actuating means carried by said stub tongue and connected to said adjusting mechanism, a power shaft, and manually operable means carried by said tongue for connecting said actuating means to said power shaft.

13. In combination, a harvester, adjusting mechanism carried thereby, a stub tongue connected to said harvester, actuating means for said adjusting mechanism carried by said stub tongue, a power shaft, and manually operated means for connecting said actuating means to said power shaft in such a manner as to move said actuating means in a plurality of directions.

14. In combination, a harvester, adjusting mechanism carried thereby, a stub tongue, an actuating member carried by said stub tongue and having a plurality of racks, a pinion connected to a power shaft and adapted to mesh with any one of said racks, and manually operable controlling means for moving any one of said racks into engagement with said pinion whereby said actuating means may be driven in a plurality of directions.

15. In combination, a harvester, adjusting mechanism carried thereby, a stub tongue, a power shaft carried thereby, a pinion mounted on said power shaft, actuating means for said adjusting mechanism having a pair of racks thereon, one of said racks being disposed above said pinion and the other of said racks being disposed below said pinion, and means for moving said actuating means in a direction to place either one of said racks into engagement with said pinion.

16. In combination, a harvester, adjusting mechanism carried thereby, a stub tongue, a power shaft carried thereby, a pinion carried by said power shaft, an actuating member for said adjusting mechanism having a pair of racks, one of said racks being positioned above said pinion and the other rack being positioned below said pinion, means for controlling said actuating member, and means for holding said controlling means in such a position that said pinion will be positioned between said racks and out of contact therewith.

17. In combination, a harvester, adjusting mechanism carried thereby, a stub tongue, a power shaft carried thereby, a pinion carried by said power shaft, an actuating member for said adjusting mechanism having a pair of racks, one of said racks being positioned above said pinion and the other rack being positioned below said pinion, means for controlling said actuating member, and resilient means for holding said controlling means in such a position that said pinion will be positioned between said racks and out of contact therewith.

18. In combination, a harvester, adjusting mechanism carried thereby, a stub tongue mounted on said harvester, a stationary bar carried by said stub tongue, a reciprocable bar carried by said stub tongue, means for connecting said reciprocable bar to said adjusting mechanism, and locking means carried by said reciprocable bar and adapted to engage said stationary bar to hold said adjusting mechanism in adjusted position.

19. In combination, a harvester, adjusting mechanism carried thereby, a stub tongue mounted on said harvester, a stationary bar carried by said stub tongue, a reciprocable bar carried by said stub tongue, means for connecting said reciprocable bar to said adjusting mechanism, and pivoted locking means carried by said reciprocable bar and adapted to engage said stationary bar to hold said adjusting mechanism in adjusted position.

20. In combination, a harvester, adjusting mechanism carried thereby, a stationary bar, a reciprocable bar connected to said adjusting mechanism, means for positively reciprocating said bar, and locking means carried by said reciprocable bar and engaging said stationary bar to hold said adjusting mechanism in adjusted position.

21. In combination, a harvester, adjusting mechanism carried thereby, a stub tongue, reciprocable actuating means carried by said stub tongue for moving said adjusting mechanism, a stationary member carried by said stub tongue, a power shaft, manually operable controlling means for connecting said reciprocable member to said power shaft, and locking means carried by said reciprocable member and engaging with said stationary member for holding said adjusting means in adjusted position.

In testimony whereof I affix my signature.

CHARLES PEARSON.